(12) United States Patent
Hale

(10) Patent No.: US 10,616,066 B2
(45) Date of Patent: Apr. 7, 2020

(54) DEVICE DISCOVERY IN A NETWORK ENVIRONMENT

(71) Applicant: Charter Communications Operating, LLC, St. Louis, MO (US)

(72) Inventor: Robert L. Hale, St. Peters, MO (US)

(73) Assignee: Charter Communications Operating, LLC, St. Louis, MO (US)

( * ) Notice: Subject to any disclaimer, the term of this patent is extended or adjusted under 35 U.S.C. 154(b) by 149 days.

(21) Appl. No.: 15/633,170

(22) Filed: Jun. 26, 2017

(65) Prior Publication Data

US 2018/0375735 A1 Dec. 27, 2018

(51) Int. Cl.
*H04L 12/24* (2006.01)
*H04L 29/12* (2006.01)
*H04L 29/08* (2006.01)
*H04L 12/701* (2013.01)

(52) U.S. Cl.
CPC .......... *H04L 41/12* (2013.01); *H04L 41/0806* (2013.01); *H04L 41/0853* (2013.01); *H04L 45/00* (2013.01); *H04L 61/2007* (2013.01); *H04L 67/14* (2013.01); *H04L 67/16* (2013.01); *H04L 41/0213* (2013.01)

(58) Field of Classification Search
CPC . H04L 41/12; H04L 41/0213; H04L 43/0811; H04L 45/02; H04L 45/00
See application file for complete search history.

(56) References Cited

U.S. PATENT DOCUMENTS

| | | | | |
|---|---|---|---|---|
| 2004/0215781 | A1* | 10/2004 | Pulsipher | H04L 29/12113 709/227 |
| 2005/0243739 | A1* | 11/2005 | Anderson | H04L 29/12009 370/254 |
| 2006/0168320 | A1* | 7/2006 | Kidd | H04L 67/16 709/238 |
| 2017/0149614 | A1* | 5/2017 | Zheng | H04L 41/12 |

* cited by examiner

Primary Examiner — Chirag R Patel
(74) Attorney, Agent, or Firm — Armis IP Law, LLC

(57) ABSTRACT

According to one configuration, during a first phase of discovery, a discovery engine (such as computer processor hardware and/or software) generates communications to multiple network addresses to detect presence of multiple network devices in a network. During a second phase discovery, such as subsequent to detecting the presence of the network devices, the discovery engine communicates with each of the detected network devices to learn of respective interconnectivity amongst the network devices. The discovery engine derives network topology information based on the detected presence and learned interconnectivity of the network devices. The network topology information indicates attributes and interconnectivity of the multiple network devices. The discovery engine stores the network topology information in a repository. The network topology information can be used for any suitable reason such as tracking an inventory of network devices, auditing of network devices, fault analysis of network devices, etc.

18 Claims, 15 Drawing Sheets

DEVICE DISCOVERY IN A NETWORK ENVIRONMENT

BACKGROUND

Conventional techniques of discovering network devices and respective network topology have advanced over the years. For example, the SNMP (Simple Network Management Protocol) is an application—layer protocol for exchanging management information between network devices. It is a part of the Transmission Control Protocol/Internet Protocol (TCP/IP) protocol suite.

In general, SNMP is a widely implemented protocol to manage and monitor network elements. An SNMP agent is a program that is packaged within a network element. The SNMP agent performs operations such as collecting management information about its local environment, storing and retrieving management information, signaling events to a corresponding manager, etc.

BRIEF DESCRIPTION OF EMBODIMENTS

There are deficiencies associated with conventional ways of collecting management information. For example, conventional collection of management information such as using SNMP agents and managers provides only limited details of a network and corresponding interconnected devices.

Embodiments herein provide novel ways of providing enhanced discovery of network devices and corresponding attributes.

More specifically, in accordance with other embodiments, during a first phase of discovery, a discovery engine (such as computer processor hardware and/or software) generates communications to each network address in a range of multiple network addresses to detect presence of multiple network devices assigned a respective address within the monitored range. The discovery engine initially may or may not be aware of which network addresses in the range are assigned to a respective network devices in the network. Based on first phase discovery and respective responses, the discovery engine tracks which, if any, network devices are present in the network environment. In certain instances, the discovery engine has access to configuration information indicating devices known to be present in a network being discovered. In such an instance, the configuration information serves as a good starting point from which to discover other network devices or confirm attributes of those devices already known to be present in a network.

During a second phase of discovery, such as subsequent to detecting the presence of the network devices, the discovery engine communicates with each of the detected network devices to learn of additional information such as respective interconnectivity amongst the network devices. For example, in one embodiment, the discovery engine derives network topology information based on the detected presence (of network devices) and learned interconnectivity of the network devices.

In one embodiment, the discovery engine or other suitable resource generates the network topology information to indicate attributes and interconnectivity of the multiple network devices.

In accordance with further embodiments, during the first phase of discovery, for each respective network address in the range, the discovery engine transmits communications to multiple different socket port numbers of the respective address being tested to learn of attributes associated with a corresponding network device assigned the respective network address. Via the communications to the different socket port numbers, the discovery engine tracks which of the network addresses in the range are assigned to corresponding network devices in the network as well as respective services provided by the network devices is learned from communicating with different socket port numbers.

In accordance with further embodiments, during the second phase of discovery, for each tracked network address assigned to a corresponding network device, the discovery engine communicates with the corresponding network device to retrieve respective connectivity data indicating interconnectivity of the corresponding network device amongst the multiple network devices. In one embodiment, the respective connectivity data indicates physical port-to-port connectivity of the corresponding network device to at least one other network device in the network.

As a further example of first phase discovery, the discovery engine communicates with a first network device in the network to learn of a network address assigned to a second network device communicatively coupled to the first network device; the discovery engine utilizes the network address of the second device to communicate with the second network device to learn of a network address assigned to a third network device communicatively coupled to the second network device; and so on. In this discovery example, the discovery engine produces the network topology information to indicate that the second network device is communicatively coupled to the first network device in response to receiving connectivity data from the first network device that the second network device is communicatively coupled to the first network device; the discovery engine produces the network topology information to indicate that the third network device is communicatively coupled to the second network device in response to receiving connectivity data from the second network device that the third network device is communicatively coupled to the first network device; and so on.

In accordance with further embodiments, subsequent to detecting presence of the multiple network devices and corresponding attributes, as well as generating the network topology information, the discovery engine stores the network topology information in a repository. The network topology information can be used for any suitable reason such as tracking an inventory of network devices in a network, auditing of network devices in a network, fault analysis of network devices and corresponding network, etc.

These and other more specific additional embodiments are disclosed herein as further discussed below.

Any of the resources as discussed herein can include one or more computerized devices, mobile communication devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware)

having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate control of a device. The instructions, when executed by computer processor hardware, cause the computer processor hardware (such as one or more processor devices) to: generate communications to a range of multiple network addresses to detect presence of multiple network devices in a network; subsequent to detecting the presence, communicate with each of the multiple network devices to learn of an interconnectivity amongst the multiple network devices; produce network topology information based on the detected presence and learned interconnectivity, the network topology information indicating attributes and interconnectivity of the multiple network devices; and store the network topology information in a repository.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of managing a network environment of multiple network elements. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
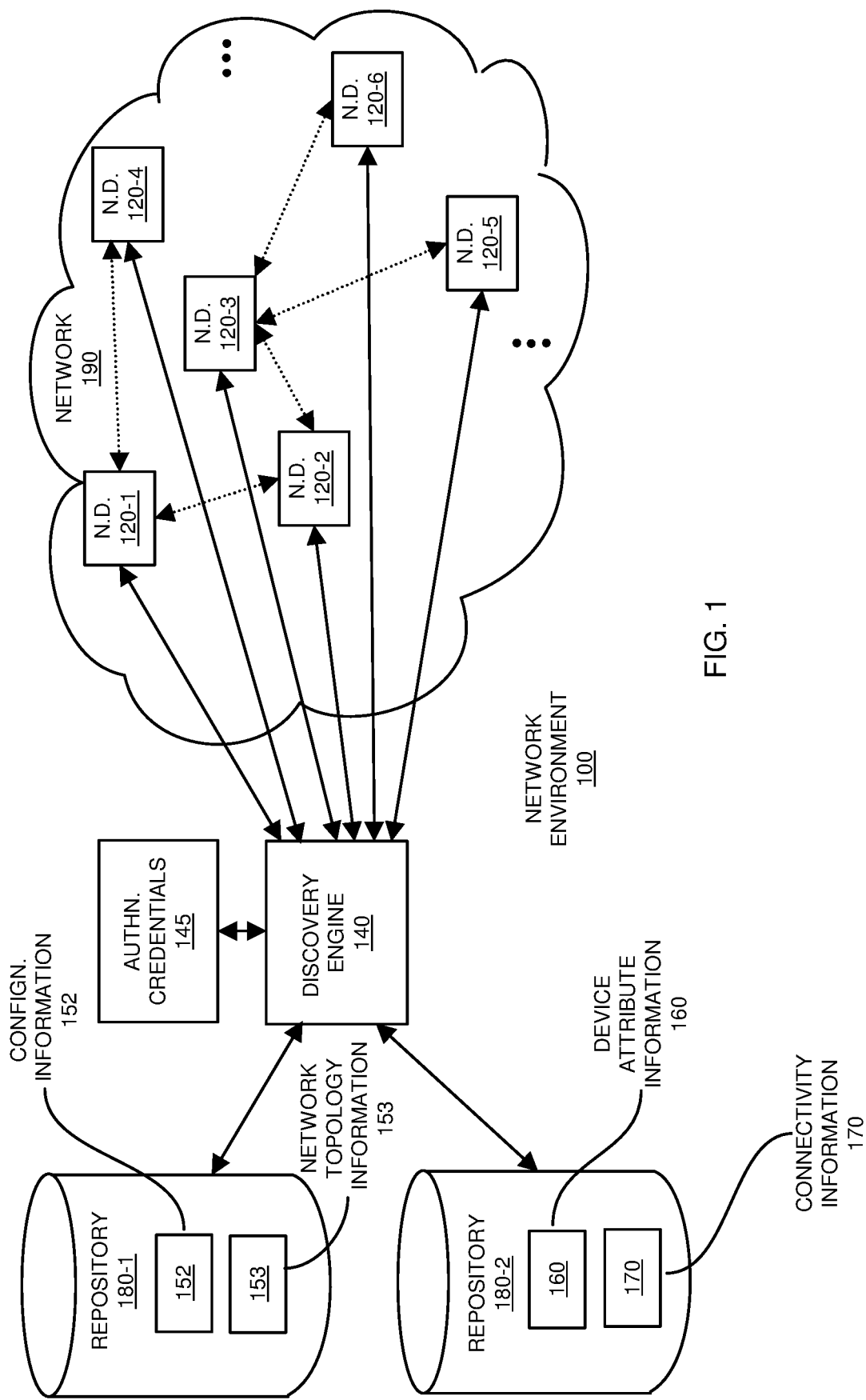
FIG. 1 is an example diagram illustrating a network device/topology discovery system according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

According to one configuration, during a first phase of discovery, a discovery engine (such as computer processor hardware and/or software) generates communications to a range of multiple network addresses to detect presence of multiple network devices in a network environment. During a second phase discovery, such as subsequent to detecting presence of one or more network devices, the discovery engine communicates with each of the detected network devices to learn of additional information such as respective interconnectivity amongst the network devices. In one embodiment, the second phase of discovery requires authentication of the discovery engine to learn of interconnectivity.

Based on the discovered information such as the detected presence and learned interconnectivity of the network devices, the discovery engine derives network topology information. In one embodiment, the network topology information indicates attributes and interconnectivity of the multiple network devices. The discovery engine stores the network topology information in a repository. The network topology information can be used for any suitable reason such as tracking an inventory of network devices, auditing of network devices, fault analysis of network devices, etc. These and additional embodiments are further discussed below.

Now, more specifically, FIG. 1 is an example diagram illustrating a network device discovery system according to embodiments herein.

As shown, network environment 100 includes discovery engine 140, repository 180-1, repository 180-2, and network 190. Network 190 includes multiple physically interconnected network devices 120 including network device 120-1, network device 120-2, network device 120-3, network device 120-4, network device 120-5, network device 120-6, etc.

In one embodiment, as its name suggests, the discovery engine 140 discovers presence of (and configuration attributes of) network devices 120 in network 190. Note that no part, all, or a less-than-all part of a respective network may be discovered prior to the discovery engine 140 proceeding with further discovery of network 190. In other words, in one instance, it may not be pre-known whether any devices are present in a network environment. In such an instance, network discovery is more challenging because no information is available about previously discovered devices or their attributes.

Alternatively, the discovery engine 140 can be configured to make connections to databases, API's (Application Programming Interfaces), alternate sources, etc., to identify pre-existing connections amongst network devices, learn device attribute information, etc., prior to performing the lower level discovery as further described herein. For example, one or more repositories (potentially disparately located with respect to each other) may store configuration information 152 indicating devices and corresponding device attribute information of devices previously discovered by the discovery engine 140 or devices that are known to be present in the network based on information from other sources. Accessing the pre-known discovery information provides the discovery engine 140 a good starting point from which to perform further discovery of devices and corresponding attributes associated with the network 190.

As previously discussed, the discovery engine 140 can be configured to implement a multi-phase discovery algorithm to identify new devices (and corresponding device attributes) or confirm presence of devices already known to be present in the network 190. More specifically, during a first phase of discovery, discovery engine 140 (such as computer processor hardware and/or software) generates communications to each of multiple network addresses within a network address range to detect presence (and respective attributes) of multiple network devices 120 within the monitored range.

In one embodiment, via use of a respective network address, the discovery engine 140 communicates with each of the network devices 120 to retrieve device attribute information 160 associated with the network devices 120. The discovery engine 140 stores the device attribute information 160 in repository 180-2.

During a second phase of discovery, such as subsequent to the first phase of detecting the presence of the network devices and communicating with the network devices 120 to retrieve respective device attribute information 160, the discovery engine 140 communicates with each of the detected network devices 120 in network 190 (over a secured communication link) to learn of respective interconnectivity amongst the network devices 120. In one embodiment, the second phase of discovery requires authentication of the discovery engine 140 in order to communicate with the network devices 120 and learn of the interconnectivity. Based on the information learned during the second phase, the discovery engine 140 creates respective connectivity information 170 for storage in repository 180-2.

In accordance with further embodiments, the discovery engine 140 uses the device attribute information 160 and the connectivity information 170 to derive network topology information 153. In one embodiment, the network topology information 153 indicates attributes (such as device type, provided services, etc.) and interconnectivity (such as port to port connectivity from one network device to another) of the multiple network devices.

The network topology information 153, device attribute information 160, connectivity information 170, etc., can be used for any suitable purpose.

For example, in one embodiment, such information is used to detect and learn implementation of new services, computers, network components as they appear or become available in the network 190. In accordance with further embodiments, such information can be used for taking inventory and classifying the network devices in network 190, auditing of network 190, performing a fault analysis of network 190, etc.

In accordance with further embodiments, the discovery engine 140 is configured to periodically, occasionally, on demand (that is, in response to receiving a command), etc., perform automated discovery with respect to network devices 120.

Figure 2:
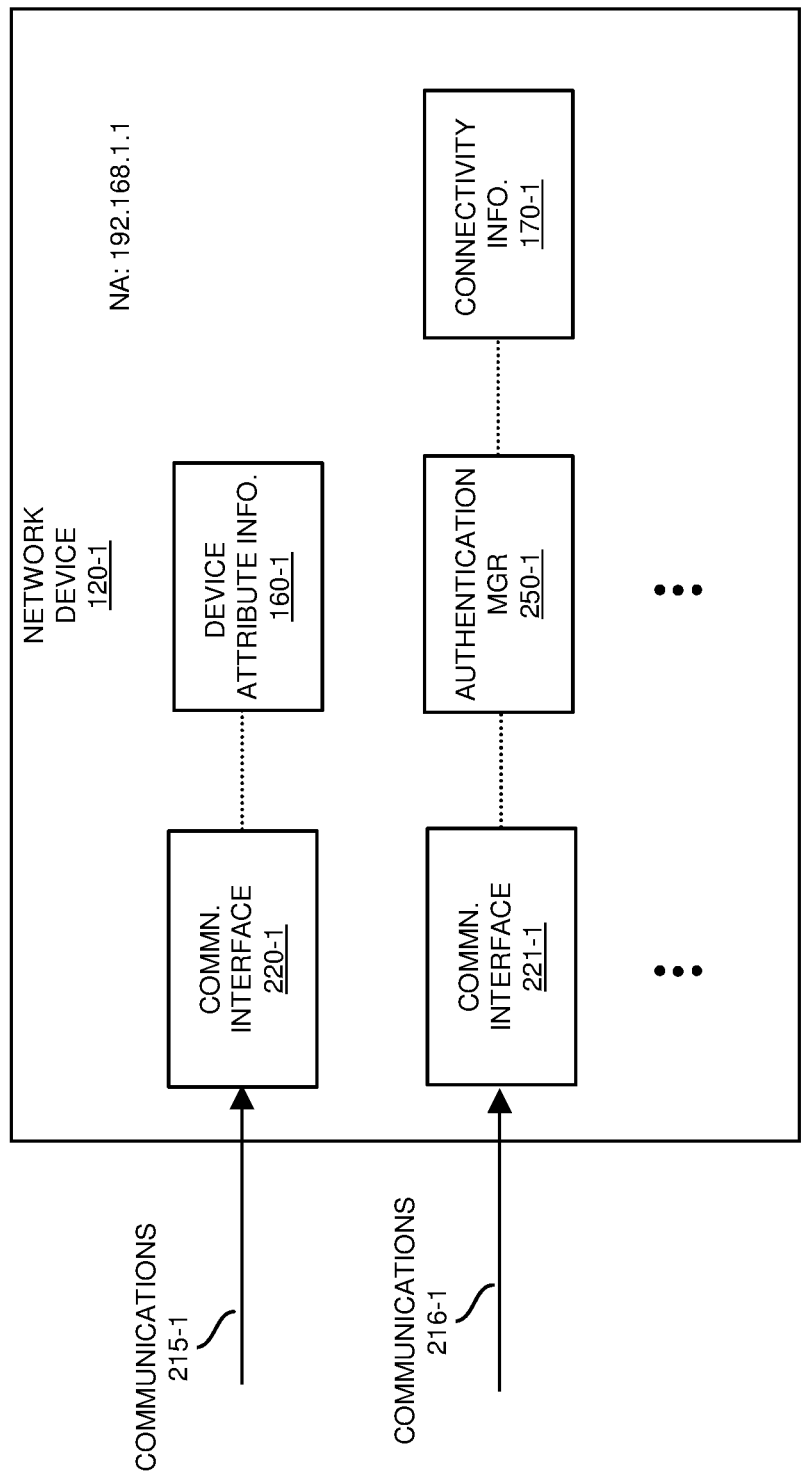
FIG. 2 is an example diagram illustrating a first network device according to embodiments herein.

FIG. 2 is an example diagram illustrating a first network device according to embodiments herein.

As shown, the network device 120-1 is assigned network address 192.168.1.1. Discovery engine 140 uses the network address 192.168.1.1 as a destination address in which to communicate with the network device 120-1. In one embodiment, the network device 120-1 includes multiple communication interfaces including communication interface 220-1 and communication interface 221-1.

As previously discussed, the discovery engine 140 communicates with the network device 120-1 during a first phase to retrieve information such as device attribute information 160-1. For example, the discovery engine 140 communicates a request (addressed to network address 192.168.1.1) to communication interface 220-1 to retrieve device attribute information 160-1. The network device 120-1 is operable to provide the device attribute information 160-1 to the discovery engine 140 without requiring authentication (such as receipt of an appropriate password) of the discovery engine 140.

As further discussed below, the discovery engine 140 attempts communication to one or more Internet socket ports (such as 22, 23, 24, 25, etc.) of the network device 120-1 to retrieve the device attribute information 160-1. For example, in one embodiment, each port of the network device 120-1 is assigned to provide specific information for a respective service, if available, from the network device 120-1.

Accordingly, via communications 215-1, the discovery engine 140 initiates retrieval of the device attribute information 160-1 from the network device 120-1.

As its name suggests, the device attribute information 160-1 indicates attributes of network device 120-1. For example, the network device 120-1 may be a server, router, switch, terminal computer device, etc. Via retrieval of the device attribute information 160-1, the discovery engine 140 learns of capabilities, device type, and/or services associated with or provided by the network device 120-1.

Further in this example embodiment, assume that the discovery engine 140 retrieves device attribute information 160-1 indicating that the network device 120-1 is a router.

During the second portion of discovery, via communications 216-1 over network 190 and corresponding authenticated communication session between the discovery engine 140 and the communication interface 221-1, the discovery engine 140 retrieves connectivity information 170-1. In one embodiment, the connectivity information 170-1 is not available to an inquiring network device unless the respective network device provides appropriate authentication information to authentication manager 250-1 of the network device 120-1 to establish the corresponding authenticated communication session.

More specifically, assume in this example embodiment that the discovery engine 140 provides appropriate authentication information (such as a login, corresponding password, etc.) through the communication interface 221-1 (such as port 80) to the authentication manager 250-1. In such an instance, after authentication by the authentication manager 250-1, the authentication manager 250-1 of network device 120-1 provides the discovery engine 140 access to the connectivity information 170-1. In other words, subsequent to authentication, the communication interface 221-1 forwards the connectivity information 170-1 to the discovery engine 140.

Figure 3:
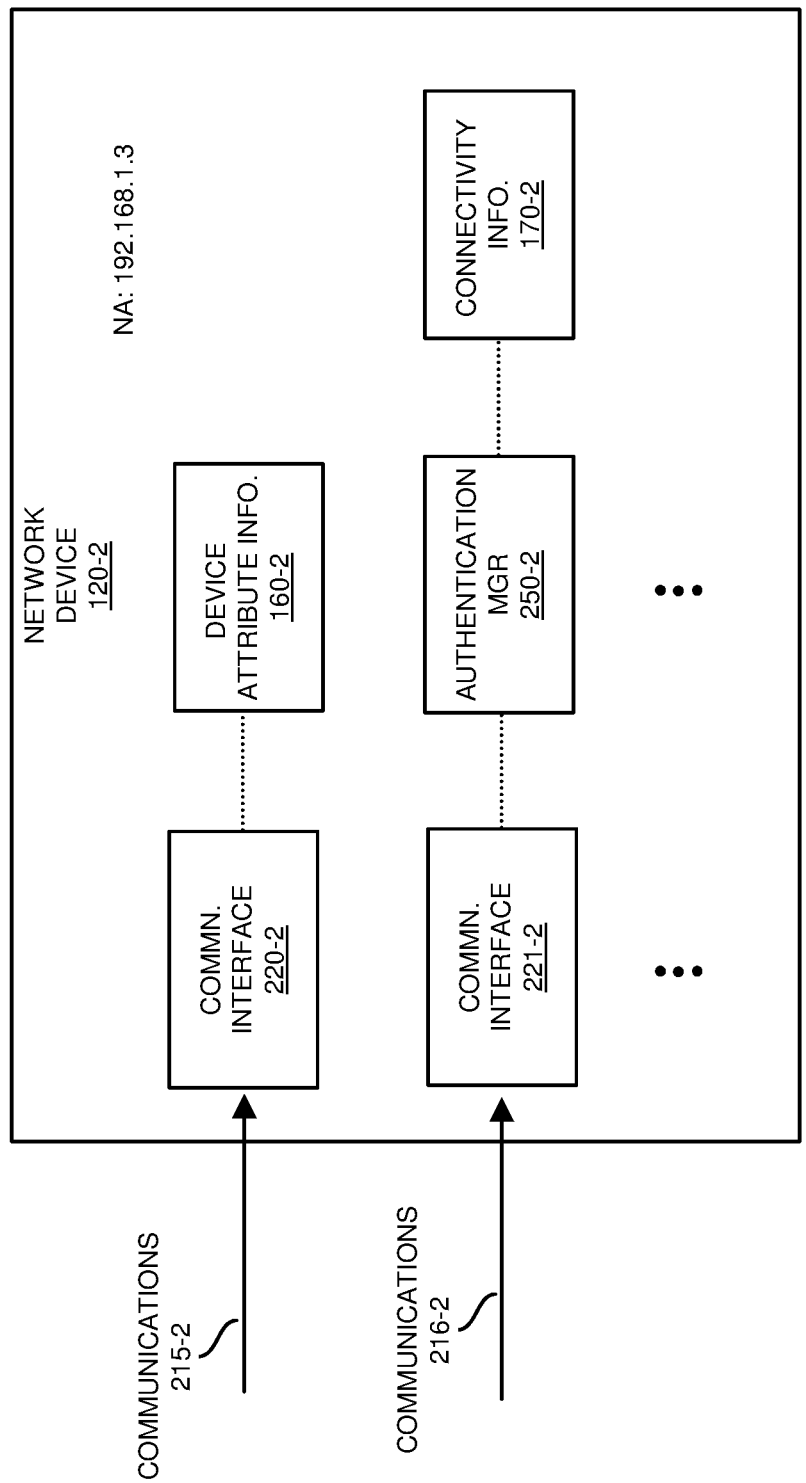
FIG. 3 is an example diagram illustrating a second network device according to embodiments herein.

FIG. 3 is an example diagram illustrating a first network device according to embodiments herein.

As shown, the network device 120-2 is assigned network address 192.168.1.3. Discovery engine 140 uses the network address 192.168.1.3 as a destination address in which to communicate with the network device 120-2 over multiple communication interfaces including communication interface 220-2 and communication interface 221-2.

As previously discussed, the discovery engine 140 communicates with the network device 120-2 during a first phase to retrieve device attribute information 160-2. In such an instance, the discovery engine 140 communicates a request (addressed to destination network address 192.168.1.3) to communication interface 220-2 to retrieve device attribute information 160-2. The network device 120-2 is operable to provide the device attribute information 160-2 without requiring authentication of the discovery engine 140.

As further discussed below, the discovery engine 140 attempts communication with any of one or more Internet socket ports (such as 22, 23, 24, 25, etc.) of the network device 120-2 to retrieve the device attribute information 160-2 associated with network device 120-2. In one embodiment, each port is assigned to provide specific information for a respective service, if available, from the network device 120-2.

Accordingly, via communications 215-2, the discovery engine 140 initiates retrieval of the device attribute information 160-2 from the network device 120-2.

As its name suggests, the device attribute information 160-2 indicates attributes of network device 120-2. For example, the network device 120-2 may be a server, router, switch, terminal computer device, etc. Via retrieval of the device attribute information 160-2, the discovery engine 140 learns of capabilities, device type, services, etc., associated with or provided by the network device 120-2.

In this example embodiment, assume that the discovery engine 140 retrieves device attribute information 160-2 indicating that the network device 120-2 is a router.

During the second portion of discovery, via communications 216-2 and corresponding authenticated communication session between the discovery engine 140 and the communication interface 221-2, the discovery engine 140 retrieves connectivity information 170-2. In one embodiment, the connectivity information 170-2 associated with the network device 120-2 is not available to the discovery engine 140 unless the respective network device provides appropriate authentication information to authentication manager 250-2 to establish the corresponding authenticated communication session.

Assume in this example embodiment, that the discovery engine 140 provides appropriate authentication information (such as a login, corresponding password, etc.) over a respective communication link through the communication interface 221-2 (such as port 80) to the authentication manager 250-2. In such an instance, after authentication, the network device 120-2 provides the discovery engine 140 access to the connectivity information 170-2. In other words, in one embodiment, subsequent to authentication, the communication interface 221-2 forwards the connectivity information 170-2 to the discovery engine 140.

Figure 4:
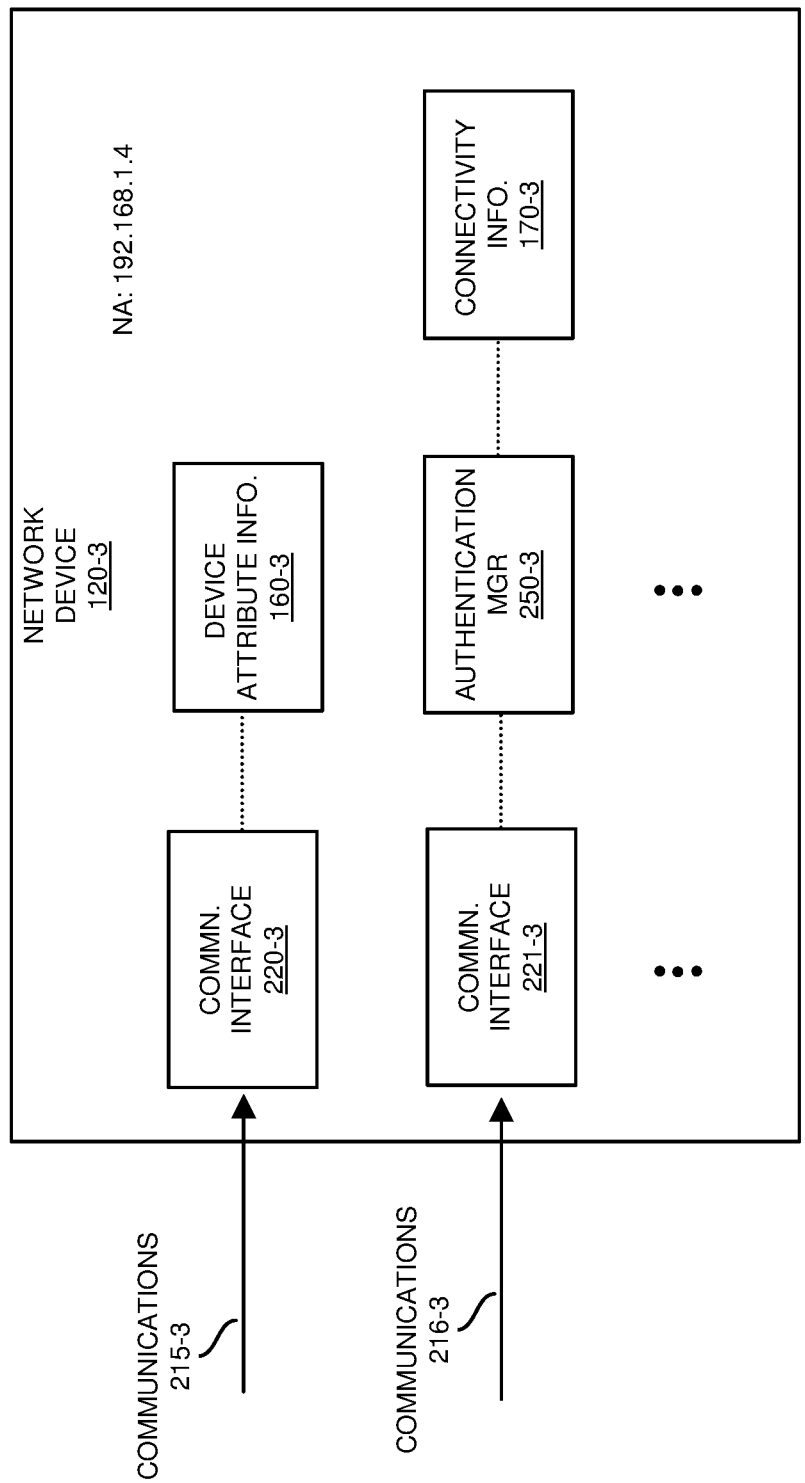
FIG. 4 is an example diagram illustrating a third network device according to embodiments herein.

FIG. 4 is an example diagram illustrating a first network device according to embodiments herein.

As shown, the network device 120-3 is assigned network address 192.168.1.4. Discovery engine 140 uses the network address 192.168.1.4 as a destination address in which to communicate with the network device 120-3 over multiple communication interfaces including communication interface 220-3 and communication interface 221-3.

As previously discussed, the discovery engine 140 communicates with the network device 120-3 during a first phase to retrieve device attribute information 160-3. In such an instance, the discovery engine 140 communicates a request (addressed to destination network address 192.168.1.3) to communication interface 220-3 to retrieve device attribute information 160-3. The network device 120-3 is operable to provide the device attribute information 160-3 without requiring authentication of the discovery engine 140.

As further discussed below, the discovery engine 140 attempts communication with one or more Internet socket ports (such as any of ports 22, 23, 24, 25, etc.) of the network device 120-3 to retrieve the device attribute information 160-3. In one embodiment, each port is assigned to provide specific information for a respective service, if available, from the network device 120-3.

Accordingly, via communications 215-3, the discovery engine 140 initiates retrieval of the device attribute information 160-3 from the network device 120-3.

As its name suggests, the device attribute information 160-3 indicates attributes of network device 120-3. For example, the network device 120-3 may be a server, router, switch, terminal computer device, etc. Via retrieval of the device attribute information 160-3, the discovery engine 140 learns of capabilities, device type, services, etc., associated with or provided by the network device 120-3.

In this example embodiment, assume that the discovery engine 140 retrieves device attribute information 160-3 indicating that the network device 120-3 is a network switch.

During the second portion of discovery, via communications 216-3 and corresponding authenticated communication session between the discovery engine 140 and the communication interface 221-3, the discovery engine 140 retrieves connectivity information 170-3. In one embodiment, the connectivity information 170-3 is not available to the discovery engine 140 unless the respective network device provides appropriate authentication information to authentication manager 250-3 to establish the corresponding authenticated communication session.

Assume in this example embodiment that the discovery engine 140 provides appropriate authentication information (such as a login, corresponding password, etc.) through the communication interface 221-3 (such as port 80) to the authentication manager 250-3. In such an instance, after authentication, the network device 120-3 provides the discovery engine 140 access to the connectivity information 170-3. In other words, subsequent to authentication, the communication interface 221-3 forwards the connectivity information 170-3 to the discovery engine 140.

Figure 5:
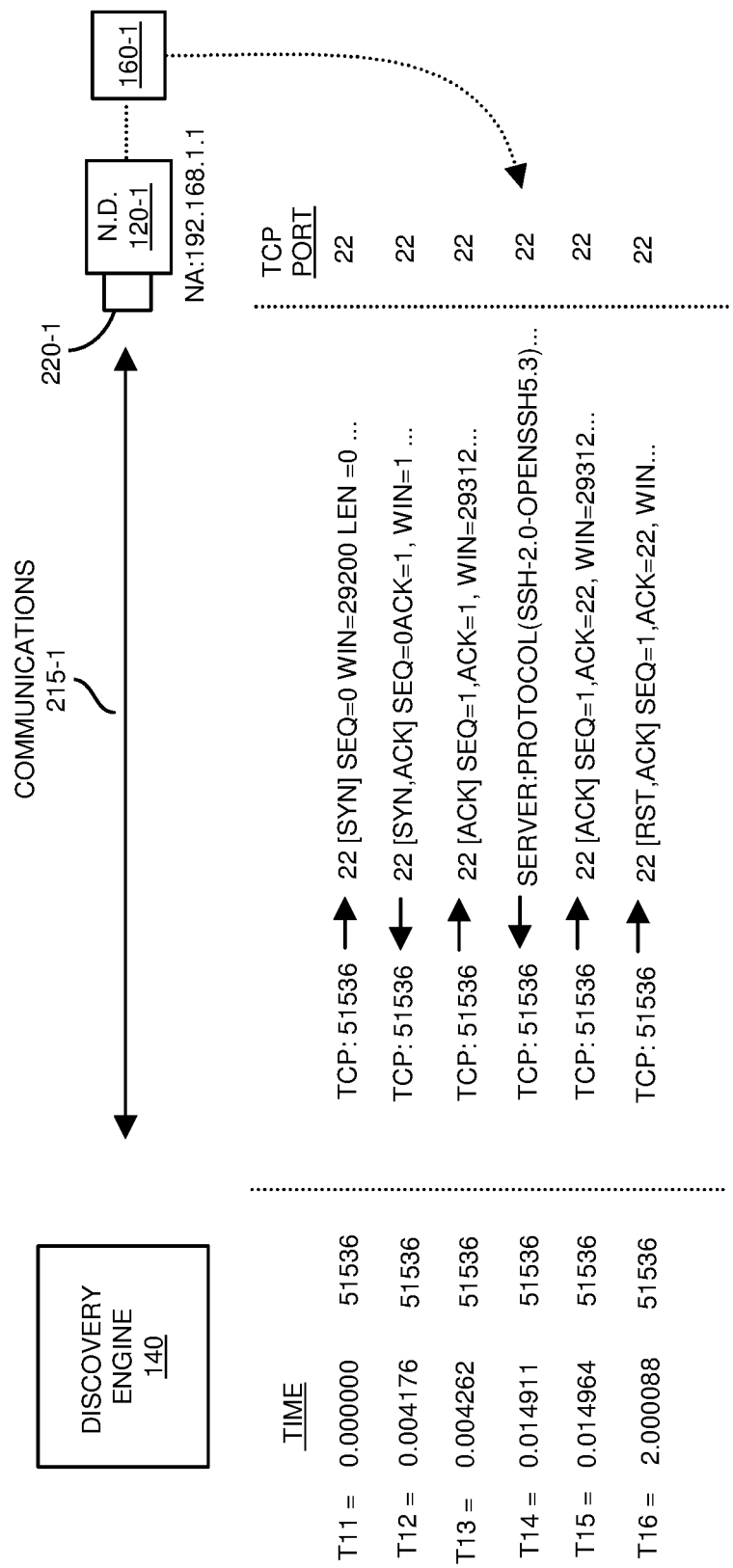
FIGS. 5 and 6 are example diagrams illustrating a first phase of discovering presence and attributes of multiple network devices according to embodiments herein.

FIG. 5 is an example diagram illustrating more details of a first phase of discovery according to embodiments herein.

As previously discussed, during the first phase of discovery, for each respective network address in the range, the discovery engine transmits communications to multiple different socket port numbers to learn of attributes associated with a corresponding network device assigned the respective network address. The discovery engine 140 tracks which of the network addresses in the range are assigned to corresponding network devices in the network as well as respective services provided by the network devices via communicating with different socket port numbers.

Assume that the network address range of the present example is 192.168.1.x, where X is an integer between 1 and 256.

As shown in FIG. 5, the discovery engine 140 communicates with a selected port of the network device 120-1 (IP network address 192.168.1.1) to retrieve any publicly available device attribute information.

More specifically, at time T11, the discovery engine 140 creates and transmits a TCP synchronization packet to initialize communication with port 22 of the network device 120-1.

At time T12, the network device 120-1 responds with a TCP SYN, ACK packet.

At time T13, the discovery engine 140 replies to port 22 of the network device 120-1 with a TCP ACK packet.

At time T14, subsequent to establishing the bi-directional flow in the communication operations as previously discussed, the network device 120-1 forwards the device attribute information 160-1, or appropriate portion thereof, to the discovery engine 140.

The discovery engine 140 processes the received device attribute information 160-1 to learn and record attributes (such as application type, application version, operating system, vendor, etc.) associated with the network device 120-1. As previously discussed, assume in this example embodiment that the device attribute information 160-1 indicates that the network device 120-1 is a server supporting one or more different corresponding types of applications (such as application 1, application 2, etc.) of a particular vendor type (such as a first vendor type).

At time T16, the discovery engine 140 terminates the communication connection via transmission of a reset commands to the network device 120-1.

The discovery engine 140 repeats this process of communicating with each of multiple Internet socket ports of network device 120-1 to learn of further device attribute information associated with network device 120-1.

Figure 6:
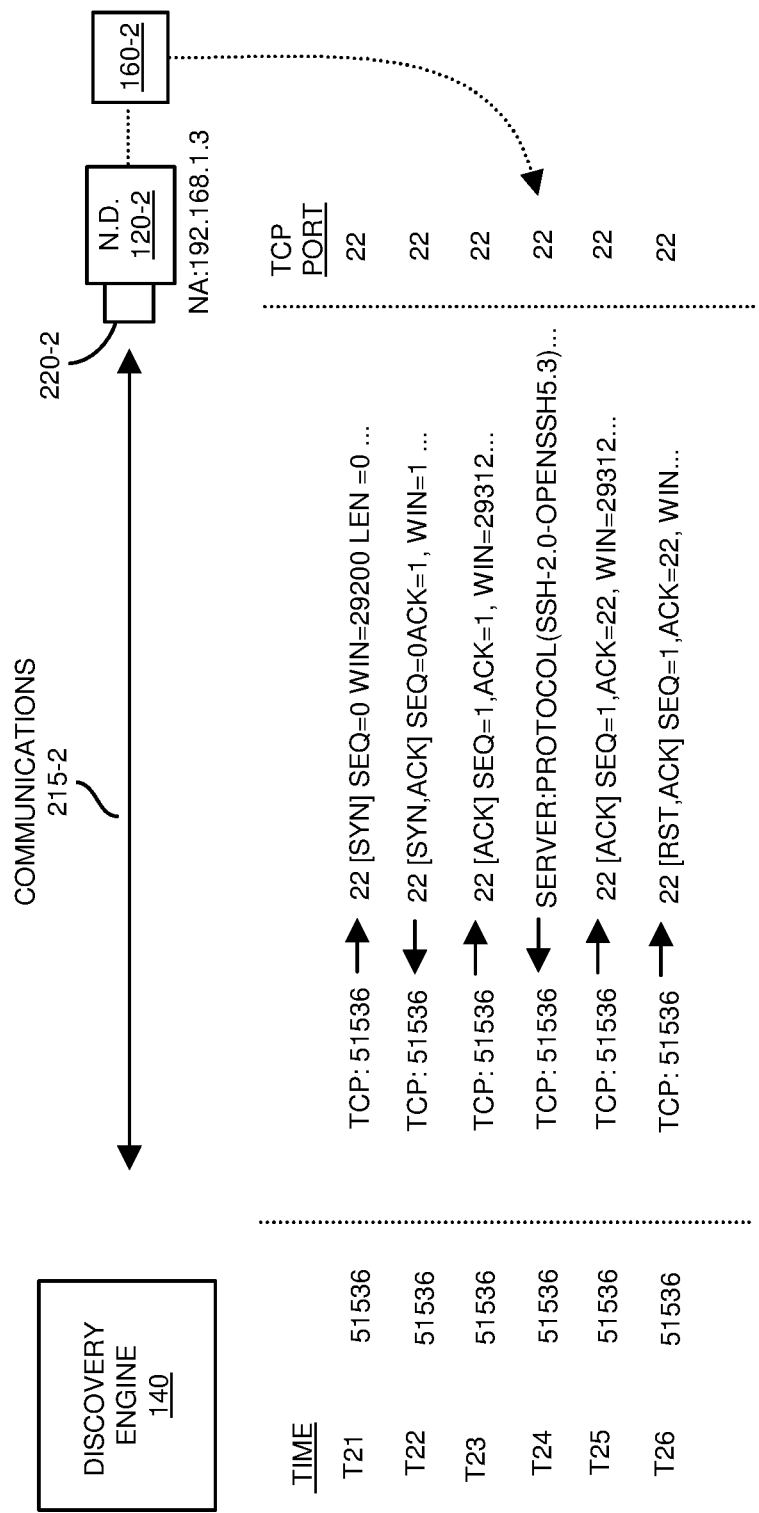

FIG. 6 is an example diagram further illustrating a first phase of discovery according to embodiments herein.

As previously discussed, during the first phase of discovery, for each respective network address in the range, the discovery engine transmits communications to multiple different socket port numbers to learn of attributes associated with a corresponding network device assigned the respective network address. The discovery engine 140 tracks which of the network addresses in the range are assigned to corresponding network devices in the network as well as respective services provided by the network devices via communicating with different Internet socket port numbers.

As previously discussed, assume that the network address range of the present example is 192.168.1.x, where X is an integer between 1 and 256.

As shown in FIG. 6, the discovery engine 140 communicates with a selected port of the network device 120-2 to retrieve any available device attribute information.

More specifically, at time T21, the discovery engine 140 creates and transmits a TCP synchronization packet to initialize communication with port 22 of the network device 120-2.

At time T22, the network device 120-2 responds with a TCP SYN, ACK packet.

At time T23, the discovery engine 140 replies to port 22 of the network device 120-2 with a TCP ACK packet.

At time T24, subsequent to establishing the bi-directional flow in the communication operations as previously discussed, the network device 120-1 forwards the device attribute information 160-2 or appropriate portion thereof, to the discovery engine 140. The discovery engine 140 processes the received device attribute information 160-1 to learn and record attributes (such as application type, application version, operating system, vendor, etc.) associated with the network device 120-2.

As previously discussed, assume in this example embodiment that the device attribute information 160-2 indicates that the network device 120-2 is a server supporting one or more different corresponding types of applications (such as application 1, application 2, etc.) and is of a particular vendor type (such as a first vendor type).

At time T26, the discovery engine 140 terminates the communication connection via transmission of a reset command to the network device 120-2.

The discovery engine 140 repeats this process of communicating with each of multiple Internet socket ports of network device 120-2 to learn of further device attribute information associated with network device 120-2.

In a similar manner, the discovery engine 140 communicates to multiple ports for each network address in the range being tested for presence of network devices.

Assume in the present example that the discovery engine 140 determines presence and attributes of network device 120-1, network device 120-2, network device 120-3, network device 120-4, etc. As further discussed below, the discovery engine 140 is operable to communicate with each of the identified network devices in the network 190 to learn of specific interconnectivity of the network devices. That is, during the second phase of discovery, for each identified and tracked network address assigned to a corresponding network device, the discovery engine communicates with the corresponding network device to retrieve respective connectivity data indicating interconnectivity of the corresponding network device amongst the multiple network devices. In one embodiment, the respective connectivity data indicates physical port-to-port connectivity of the corresponding network device to at least one other network device in the network.

Figure 7:
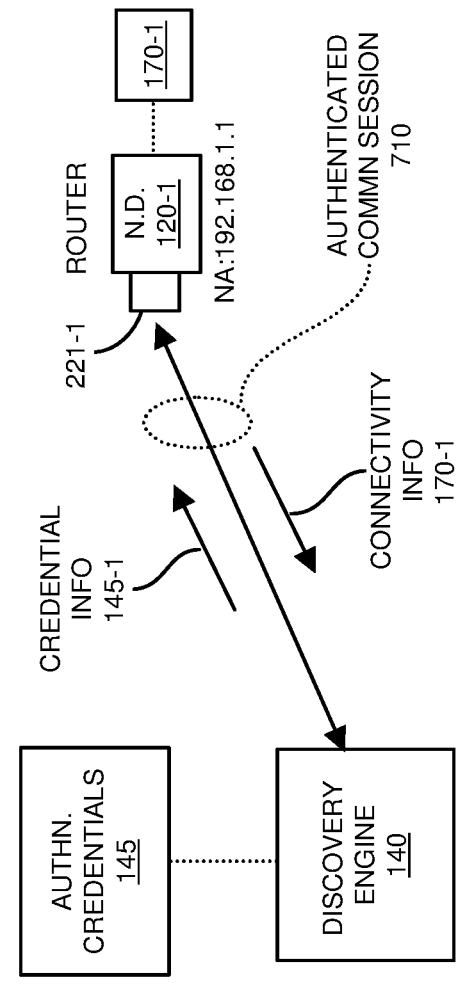
FIGS. 7, 8, and 9 are example diagrams illustrating a second phase of discovering attributes (such as interconnectivity) of multiple network devices according to embodiments herein.

More specifically, FIG. 7 is an example diagram illustrating a second phase of discovery according to embodiments herein.

As previously discussed, during the first discovery phase, the discovery engine 140 identifies which of one or more network devices are present in network environment 100. To provide enhanced network discovery (via the second discovery phase) according to embodiments herein, the discovery engine 140 communicates with any network devices known to be present in the network environment 100 such as the network devices discovered during the first phase, network devices known to be present from a previous network discovery, etc., to determine interconnectivity amongst the detected network devices.

Note that, in certain instances, the discovery engine 140 may not identify every network device in the network environment 100. In the second phase, the discovery engine 140 communicates with each of the network devices known to be present in the network environment 100 to learn of respective connectivity of the network devices amongst each other. The discovery engine 140 may discover new devices during the second phase that were not discovered during the first phase.

Further in this example embodiment, to learn of interconnectivity of network devices during the second phase, the discovery engine 140 communicates with each of the network devices 120 to retrieve secure information such as connectivity information 170.

To communicate with the network device 120-1, the discovery engine 140 retrieves appropriate authentication information from credential information 145-1 (such as username, password, etc.) and forwards it over a respective communication link to the communication interface 221-1 (such as port 80 of IP network address 192.168.1.1) to establish a secured communication link, tunnel, etc.

The network device 120-1 processes the received credential information 145-1 to authenticate the discovery engine 140. Subsequent to authentication and establishing a secured communication link (such as over SSH or Secure SHell), the discovery engine 140 requests retrieval of connectivity information 170-1 over the established communication link.

In one embodiment, the connectivity information 170-1 is managed (such as collected, maintained, etc.) by the network device 120-1 and indicates information such as which other network devices the given network device 120-1 is communicatively coupled.

By way of non-limiting example, the connectivity information 170-1 can be or include so-called ARP (Address Resolution Protocol) data or any other suitable data (produced or gathered by the network device 120-1) indicating connectivity data associated with the network device 120-1 assigned IP network address 192.168.1.1.

Assume in this example that the connectivity information 170-1 provided by the network device 120-1 indicates that the network device 120-1 is assigned a MAC address of XYZ1 and that the port P1 of the network device 120-1 is communicatively coupled via a communication link 720 to network device 120-4 (assigned IP network address 192.168.1.2). Because the network device 120-4 is known to be an end device (that is, there are no other devices connected to it), there may be no need for the discovery engine to perform further queries with respect to the network device 120-4. Additionally or alternatively, note that the network device 120-4 may store information that requires authentication before forwarding to the discovery engine 140. Accordingly, certain embodiments herein may include the discovery engine 140 communicating with the network device 120-4 to retrieve connectivity information or other information stored and/or produced by the network device 120-4.

Additionally, assume in this example embodiment, that the connectivity information 170-1 further indicates that the port P2 of the network device 120-1 is communicatively coupled to the port P1 of the network device 120-2 (IP network address 192.168.1.3) via the communication link 730.

Accordingly, via the connectivity information 170-1, the discovery engine 140 learns of interconnectivity with respect to network device 120-1 and one or more other network devices.

Figure 8:
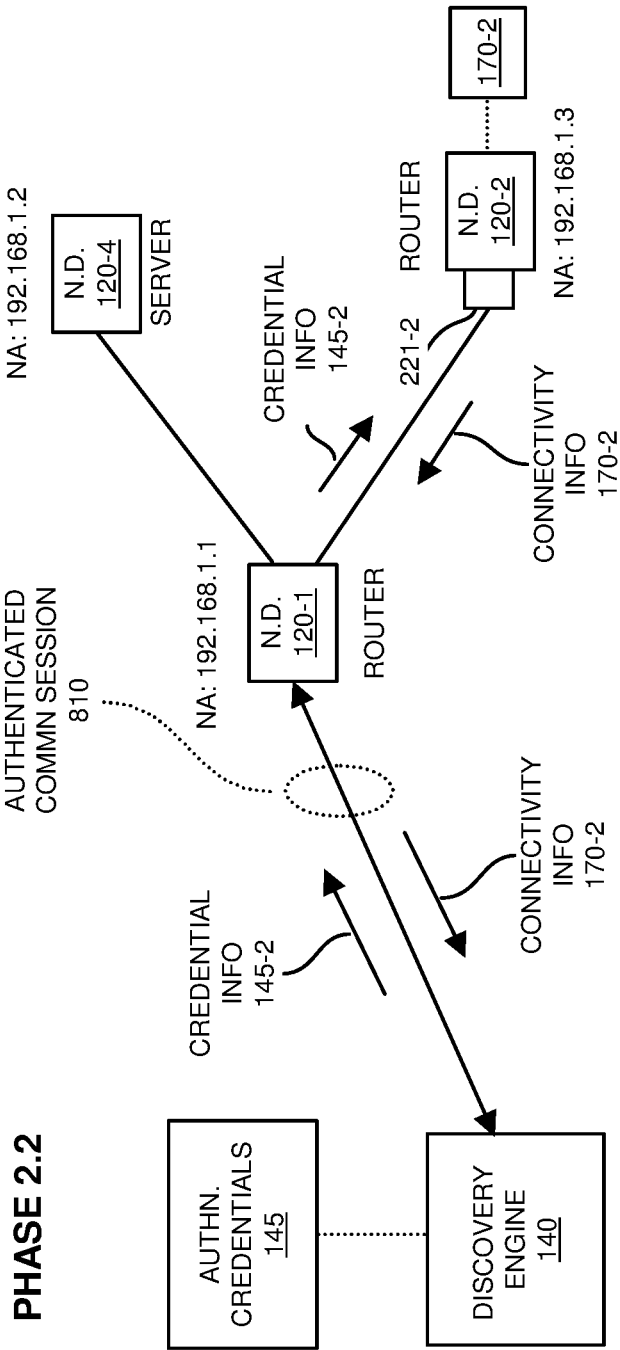

FIG. 8 is an example diagram illustrating a second phase of discovery according to embodiments herein.

Further in this example embodiment, to learn of interconnectivity of network devices during the second phase, and based on detecting that network device 120-2 is coupled to network device 120-1 as previously discussed in FIG. 7, the discovery engine 140 then communicates with the network device 120-2 to retrieve information such as connectivity information 170-2 associated with network device 120-2 (network address 192.168.1.3). The interconnectivity information 170-2 indicates devices coupled to network device 120-2.

To communicate with the network device 120-2 (IP network address 192.168.1.3), the discovery engine 140 retrieves appropriate credential information 145-2 (authentication information needed to communicate with communication interface 221-2) and forwards it over a respective communication link to the communication interface 221-1 (such as port 80 of IP network address 192.168.1.3) to establish a secured communication link. The authentication manager 250-2 of the network device 120-2 processes the received credential information 145-2 to authenticate the discovery engine 140. Subsequent to authentication and establishing a secured communication link (such as over SSH a.k.a. Secure Shell or other suitable link) between the discovery engine 140 and network device 120-2, the discovery engine 140 requests retrieval of connectivity information 170-2 associated with network device 120-2.

In one embodiment, the connectivity information 170-2 is managed (such as collected, maintained, etc.) by the network device 120-2 and indicates information such as which other network devices the given network device 120-2 is communicatively coupled. By way of non-limiting example, the connectivity information 170-2 can be or include so-called ARP (Address Resolution Protocol) or any other suitable data (produced, stored, or gathered by the network device 120-2) indicating connectivity associated with the network device 120-2 assigned IP network address 192.168.1.3 to one or more other network devices.

Assume in this example that the connectivity information 170-2 provided by the network device 120-2 indicates that the network device 120-2 is assigned a MAC address of XYZ3 and that the port P1 of the network device 120-2 is communicatively coupled via a communication link 730 to port P2 of network device 120-1 (IP network address 192.168.1.1).

Additionally, assume in this example embodiment, that the connectivity information 170-2 further indicates that the port P5 of the network device 120-2 is communicatively coupled to the port P1 of the network device 120-3 (IP network address 192.168.1.4) via the communication link 830.

Accordingly, via the connectivity information 170-2, the discovery engine 140 learns of interconnectivity associated with network device 120-2 and other network devices in network environment 100.

Figure 9:
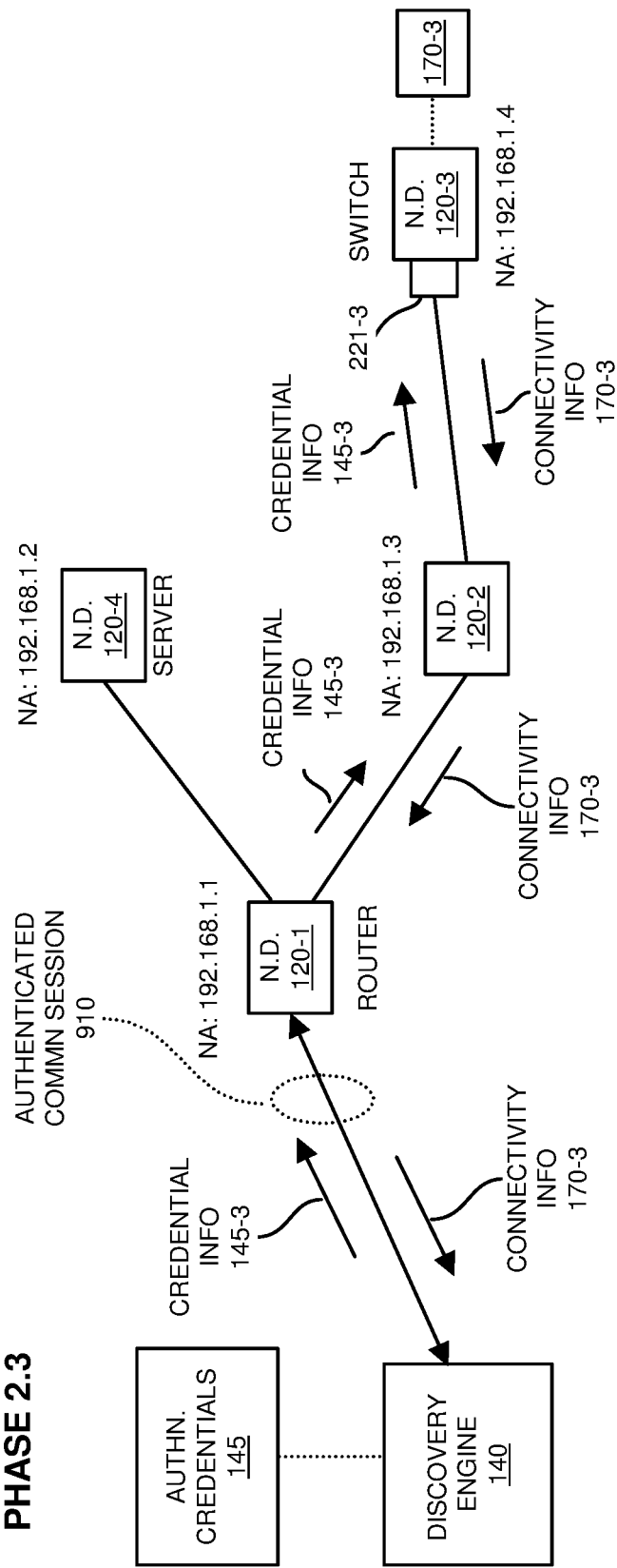

FIG. 9 is an example diagram illustrating a second phase of discovery according to embodiments herein.

Further in this example embodiment, to learn of interconnectivity of network devices during the second phase, and based on detecting that network device 120-3 is coupled to network device 120-2 as previously discussed in FIG. 8, the discovery engine 140 then communicates with the network device 120-3 to retrieve information such as connectivity information 170-3 associated with network device 120-3 (IP network address 192.168.1.4). In this example embodiment, assume that the interconnectivity information 170-3 indicates that network device 120-3 is coupled to network device 120-5 and network device 120-6.

To communicate with the network device 120-3 (network address 192.168.1.4), the discovery engine 140 retrieves appropriate credential information 145-3 (authentication information needed to communicate with communication interface 221-3 of network device 120-3) and forwards it over a respective communication link to the communication interface 221-3 (such as port 80 of IP network address 192.168.1.4) to establish a secured communication link.

The network device 120-3 processes the received credential information 145-3 to authenticate the discovery engine 140. Subsequent to authentication and establishing a secured communication link (such as over SSH a.k.a. Secure Shell or other suitable link), the discovery engine 140 requests retrieval of connectivity information 170-3 associated with network device 120-3.

In one embodiment, the connectivity information 170-3 is managed (such as collected, maintained, etc.) by the network device 120-3 and indicates information such as which other network devices the given network device 120-3 is communicatively coupled. By way of non-limiting example, the connectivity information 170-3 can be or include so-called ARP (Address Resolution Protocol) or any other suitable data (produced or gathered by the network device 120-3) indicating connectivity associated with the network device 120-3 assigned IP network address 192.168.1.4 to one or more other network devices.

Assume in this example that the connectivity information 170-3 provided by the network device 120-3 over communication link 830 indicates that the network device 120-3 is assigned a MAC address of XYZ4 and that the port P1 of the network device 120-3 is communicatively coupled via a communication link 830 to network device 120-2 (IP network address 192.168.1.3).

Additionally, assume in this example embodiment, that the connectivity information 170-3 further indicates that network device 120-5 is assigned a MAC address of XYZ5 and that the port P2 of the network device 120-3 is communicatively coupled to the port P2 of the network device 120-5 (network address 192.168.1.5) via a communication link 840.

Additionally, assume in this example embodiment, that the connectivity information 170-3 further indicates that network device 120-6 is assigned a MAC address of XYZ6 and that the port P3 of the network device 120-3 is communicatively coupled to the port P4 of the network device 120-6 (IP network address 192.168.1.6) via the communication link 850.

Thus, according to embodiments herein, the discovery engine 140 is operable to learn of a network address assigned to a first network device 120-1. The discovery engine 140 communicates with the first network device 120-1 to learn of a network address assigned to a second network device 120-2 that is communicatively coupled to the first network device. The discovery engine utilizes the network address of the second device to communicate with the second network device and learn of a respective network address assigned to a third network device 120-3 communicatively coupled to the second network device 120-2, and so on. In this way, the discovery engine 140 is able to iteratively detect attributes of and learn a connectivity topology of multiple network devices in a respective network environment 100.

In this example embodiment, the discovery engine 140 produces network topology information 153 indicating attributes and connectivity of the network devices as obtained during first phase and second phase discovery.

Figure 10:
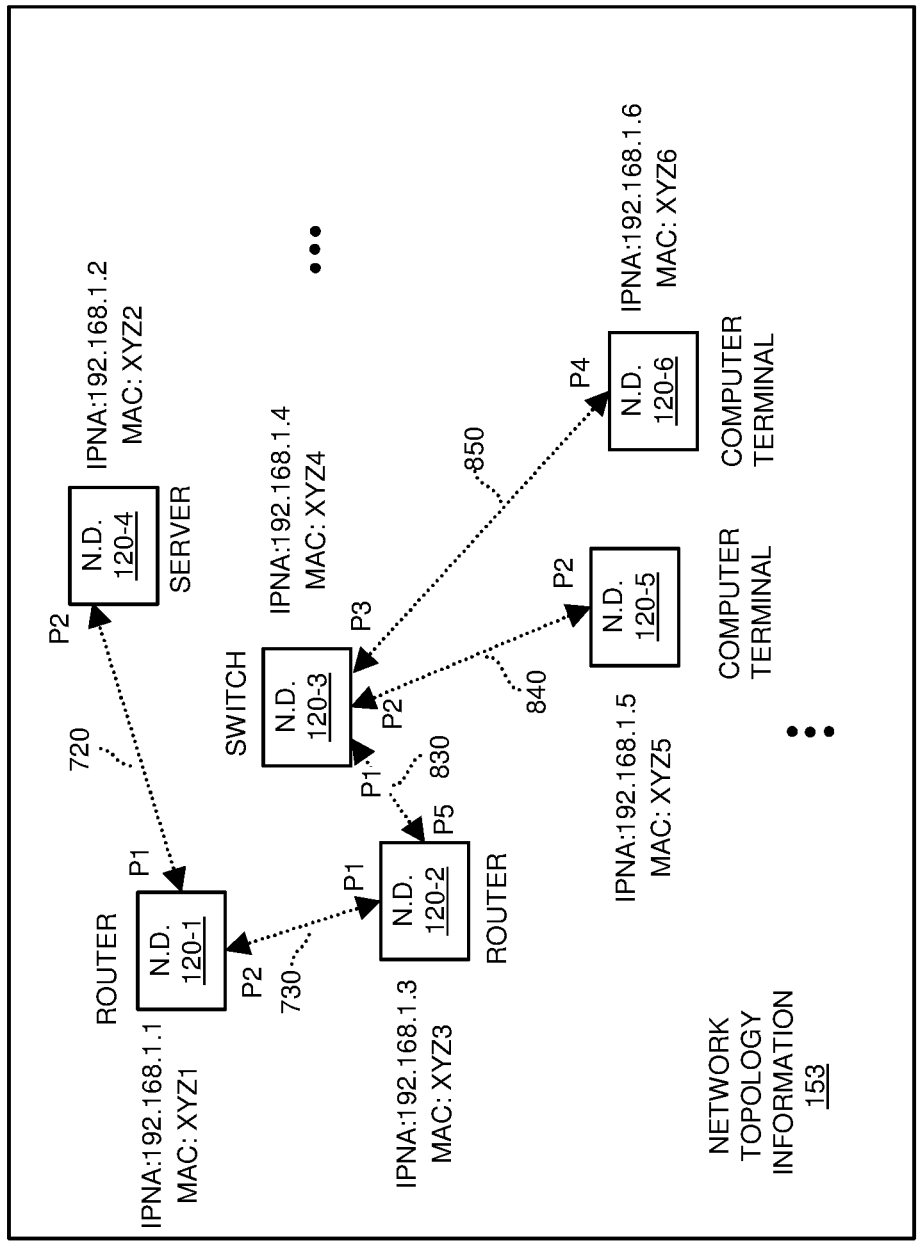
FIG. 10 is an example diagram illustrating generation of network topology information based on discovered information according to embodiments herein.

FIG. 10 is an example diagram illustrating generation of network topology information from discovered information according to embodiments herein.

In accordance with further embodiments, subsequent to detecting presence of the multiple network devices and retrieving corresponding attributes and connectivity information in a manner as previously discussed, the discovery engine 140 creates and stores the network topology information 153 in repository 180-1. In other words, via the information collected as discussed above in FIGS. 5-9, the discovery engine 140 generates network topology information 153 as shown in FIG. 10.

Note again that the network topology information 153 can be used for any suitable reason such as tracking an inventory of network devices 120 in network 190, auditing of network devices 120 in network 190, fault analysis of network devices 120 in network 190, installation of one or more new network devices in network 190, etc.

Figure 11:
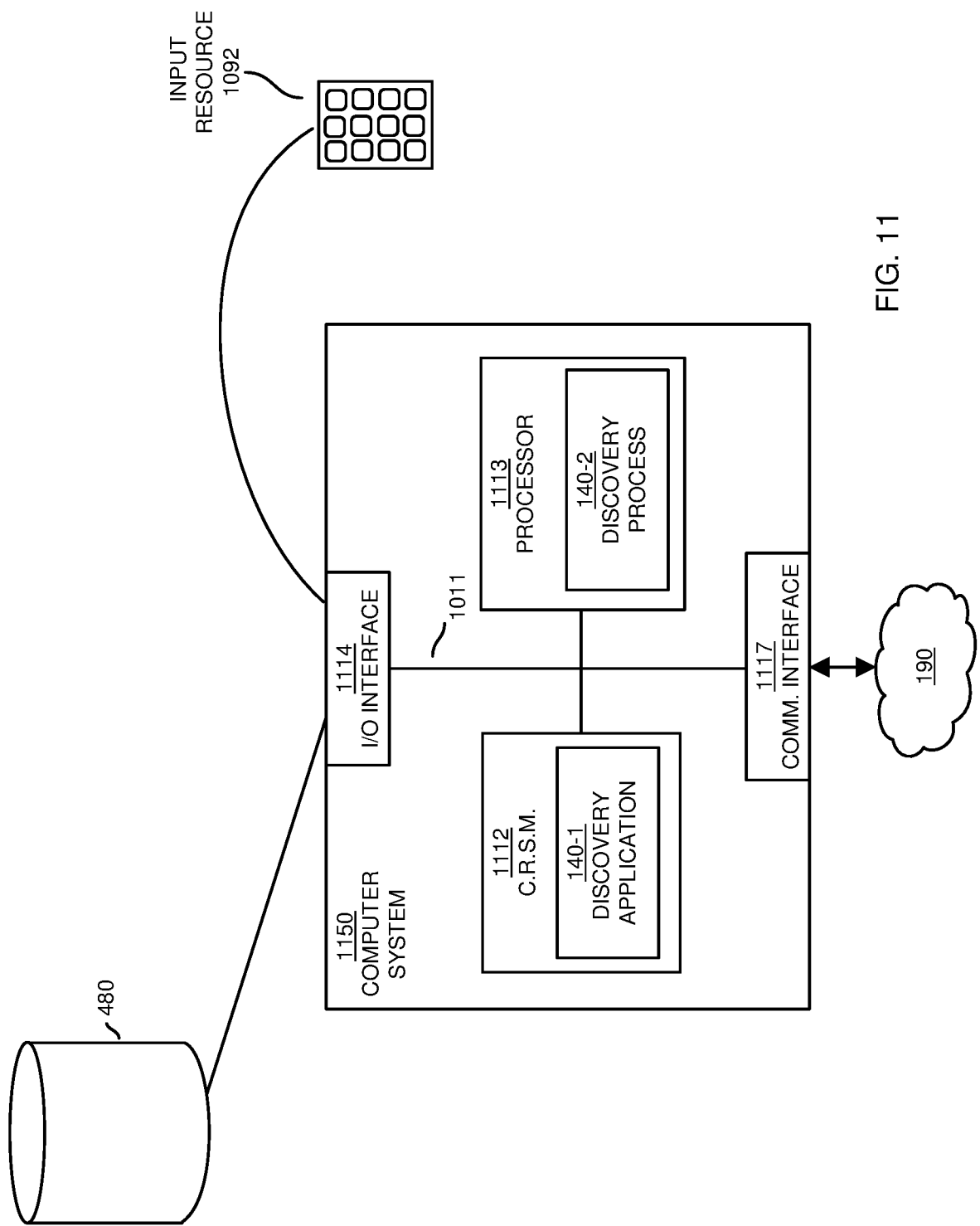
FIG. 11 is a diagram illustrating an example computer architecture to execute operations according to embodiments herein.

FIG. 11 is an example block diagram of a computer system for implementing any of the operations as discussed herein according to embodiments herein.

Any of the resources as discussed herein can be configured to include a processor and executable instructions to carry out the different operations as discussed herein.

As shown, computer system 1150 (such as a respective server resource) of the present example can include an interconnect 1011 that couples computer readable storage media 1112 such as a non-transitory type of media (i.e., any type of hardware storage medium) in which digital information can be stored and retrieved, a processor 1113, I/O interface 1114, and a communications interface 1117.

I/O interface 1114 supports connectivity to repository 480 and input resource 1092.

Computer readable storage medium 1112 can be any hardware storage device such as memory, optical storage, hard drive, floppy disk, etc. In one embodiment, the computer readable storage medium 1112 stores instructions and/or data.

As shown, computer readable storage media 1112 can be encoded with discovery application 140-1 (e.g., including instructions) to carry out any of the operations as discussed herein.

During operation of one embodiment, processor 1013 accesses computer readable storage media 1112 via the use of interconnect 1011 in order to launch, run, execute, interpret or otherwise perform the instructions in discovery application 140-1 stored on computer readable storage medium 1112. Execution of the discovery application 140-1 produces discovery process 140-2 to carry out any of the operations and/or processes as discussed herein.

Those skilled in the art will understand that the computer system 1150 can include other processes and/or software and hardware components, such as an operating system that controls allocation and use of hardware resources to discovery application 140-1.

In accordance with different embodiments, note that computer system may be or included in any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1050 may reside at any location or can be included in any suitable resource in any network environment to implement functionality as discussed herein.

Functionality supported by the different resources will now be discussed via flowcharts in FIG. 12. Note that the steps in the flowcharts below can be executed in any suitable order.

Figure 12:
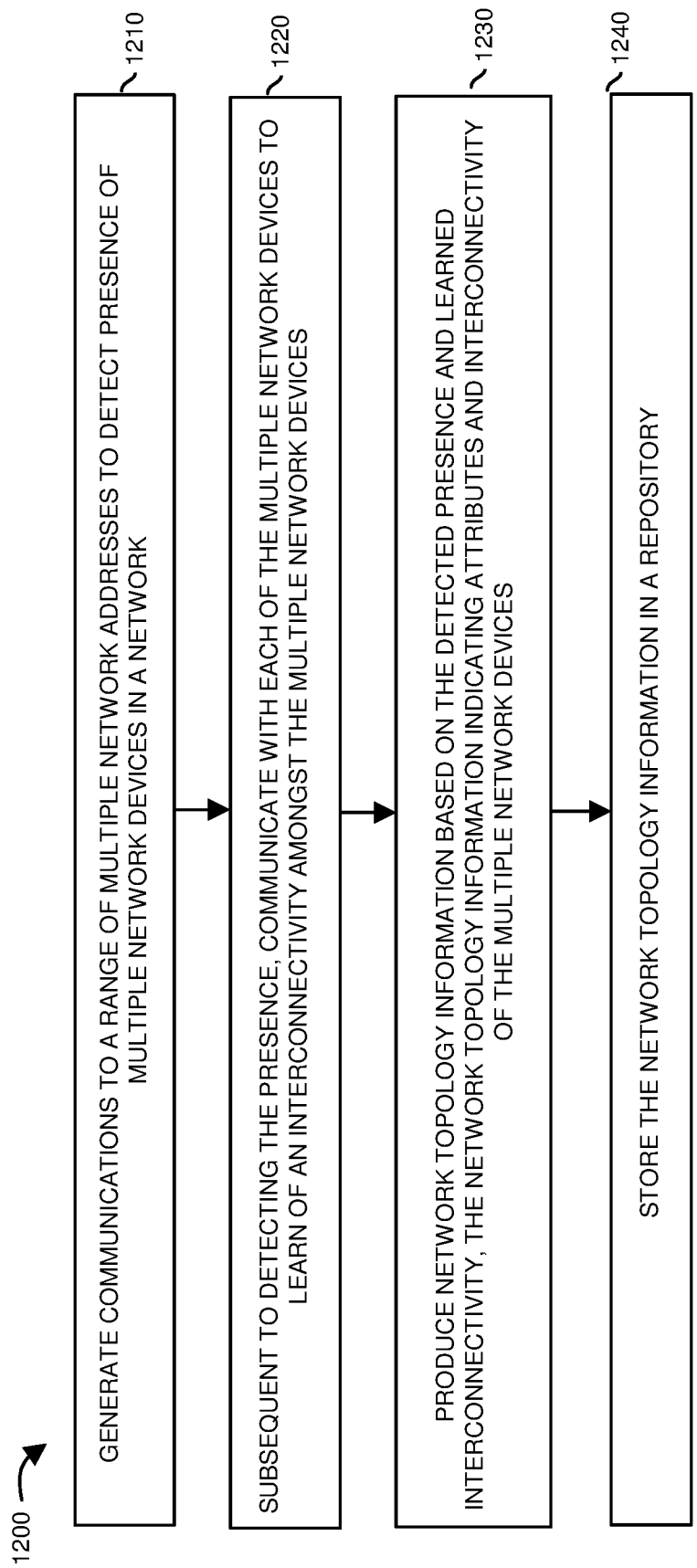
FIGS. 12-14 are example diagrams illustrating methods according to embodiments herein.

FIG. 12 is a flowchart 1200 illustrating an example method according to embodiments herein. Note that there will be some overlap with respect to concepts as discussed above.

In processing operation 1210, the discovery engine 140 generates communications to a range of multiple network addresses to detect presence of multiple network devices 120 in network 190.

In processing operation 1220, subsequent to detecting the presence, the discovery engine 140 communicates with each of the multiple network devices 120 to learn of interconnectivity amongst the multiple network devices 120.

In processing operation 1230, the discovery engine 140 produces network topology information 153 based on the detected presence (device attribute information 160) and learned interconnectivity (via connectivity information 170). The network topology information 153 indicates device attributes 160 as well as interconnectivity of multiple network devices 120.

In processing operation 1240, the discovery engine 140 stores the network topology information 153 in repository 180-1.

Figure 13:
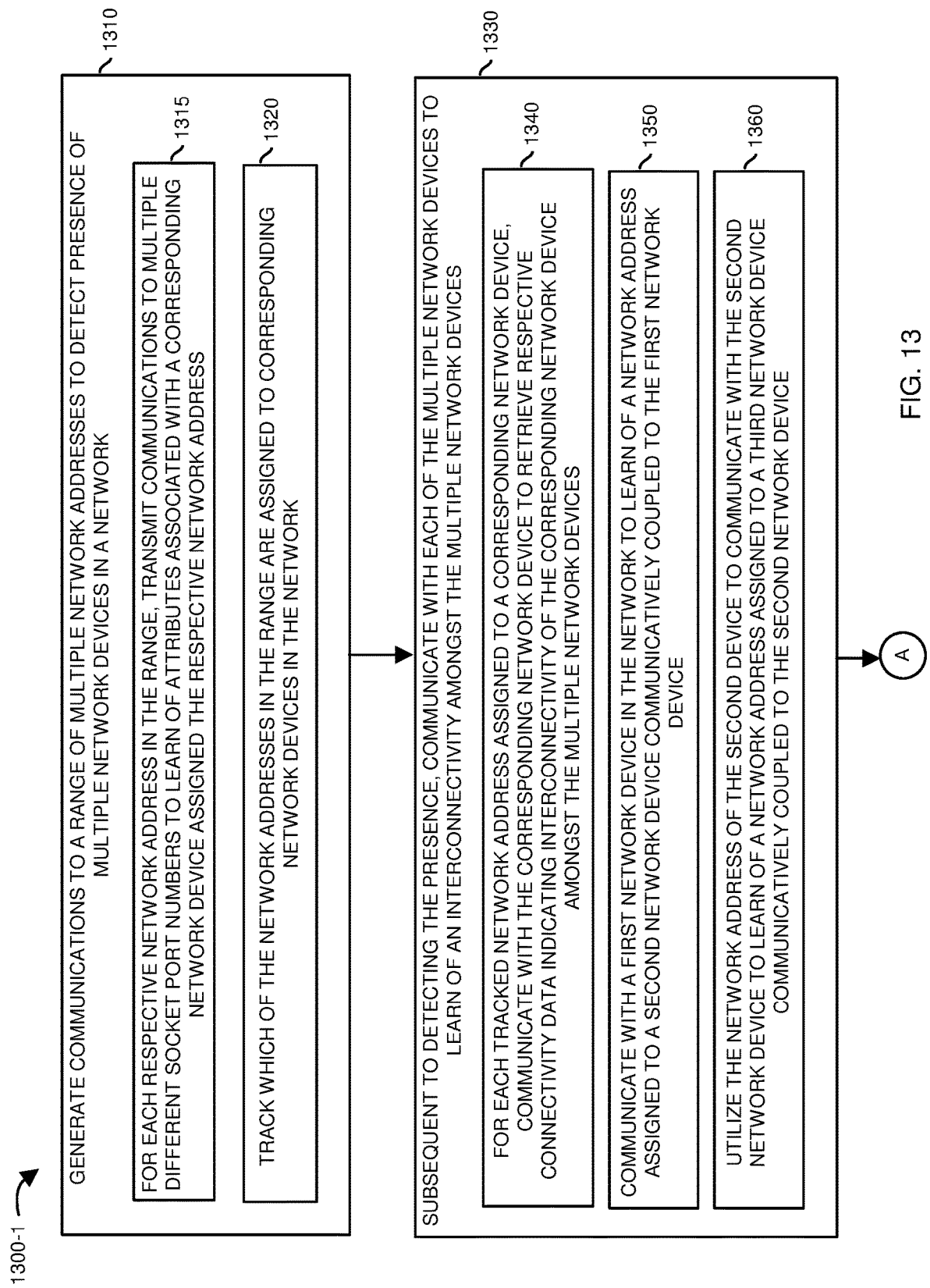

FIG. 13 is a flowchart illustrating an example method according to embodiments herein. Note that there will be some overlap with respect to concepts as discussed above.

In processing operation 1310 of flowchart 1300-1 (FIG. 13), the discovery engine 140 generates communications to a range of multiple network addresses to detect presence of multiple network devices 120 in network 190.

In processing operation 1315, for each respective network address in the range, the discovery engine 140 transmits communications to multiple different IP socket port numbers to learn of attributes associated with a corresponding network device assigned the respective network address.

In processing operation 1320, the discovery engine 140 tracks which of the network addresses in the range are assigned to corresponding network devices 120 in the network 190.

In processing operation 1330, subsequent to detecting the presence, the discovery engine 140 communicates with each of the multiple network devices 120 to learn of interconnectivity amongst the multiple network devices 120.

In processing operation 1340, for each tracked network address, the discovery engine 140 communicates with the corresponding network device to retrieve respective connectivity data indicating interconnectivity of the corresponding network device amongst the multiple network devices 120.

In processing operation 1350, the discovery engine 140 communicates with a first network device 120-1 in the network to learn of a network address assigned to a second network device 120-2 communicatively coupled to the first network device 120-1.

In processing operation 1360, the discovery engine 140 utilizes the network address of the second network device 120-2 to communicate with the second network device 120-2 to learn of a network address assigned to a third network device 120-3 communicatively coupled to the second network device 120-2.

Figure 14:
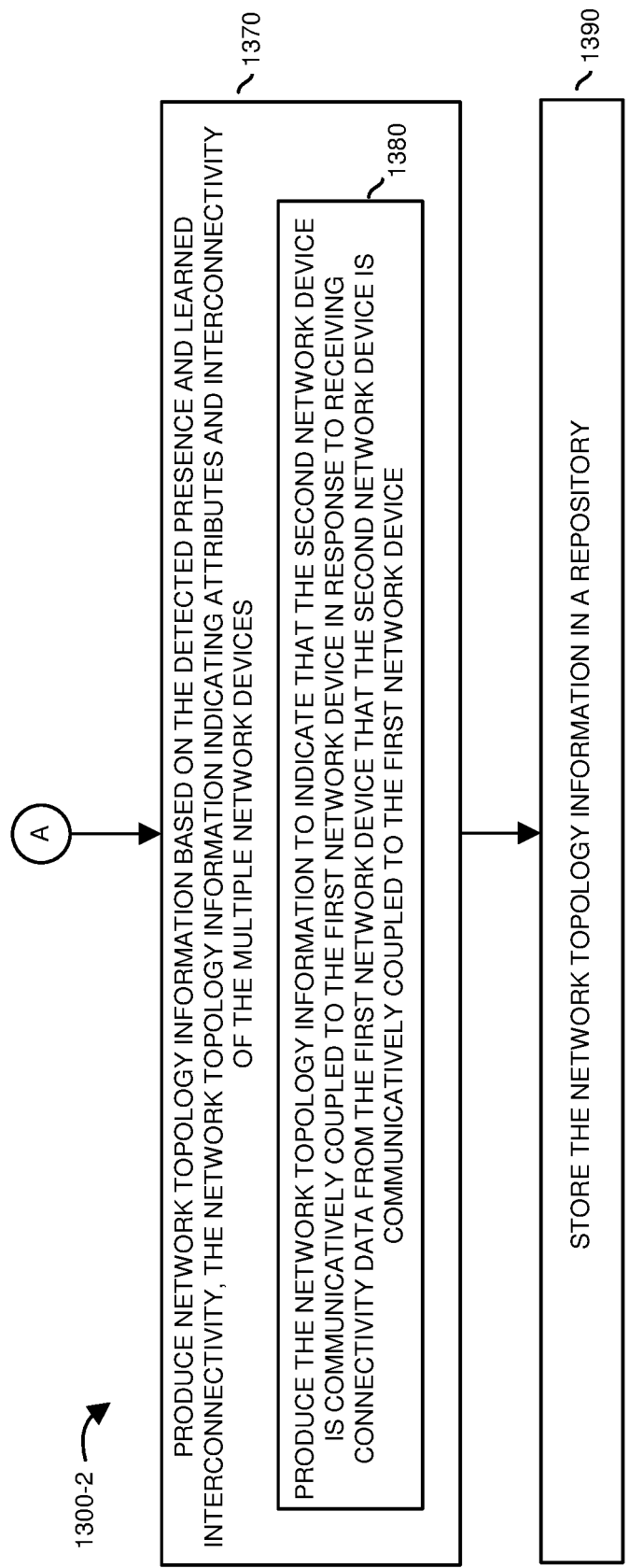

In processing operation 1370 of flowchart 1370 (in FIG. 14), the discovery engine 140 produces network topology information 153 based on the detected presence and learned interconnectivity, the network topology information 153 indicating attributes and interconnectivity of the multiple network devices 120 in network 190.

In processing operation 1380, the discovery engine 140 produces the network topology information 153 to indicate that the second network device 120-2 is communicatively coupled to the first network device 120-1 in response to receiving connectivity data from the first network device 120-1 that the second network device 120-2 is communicatively coupled to the first network device 120-1.

In processing operation 1390, the discovery engine 140 stores the network topology information 153 in a repository 180-1.

Figure 15:
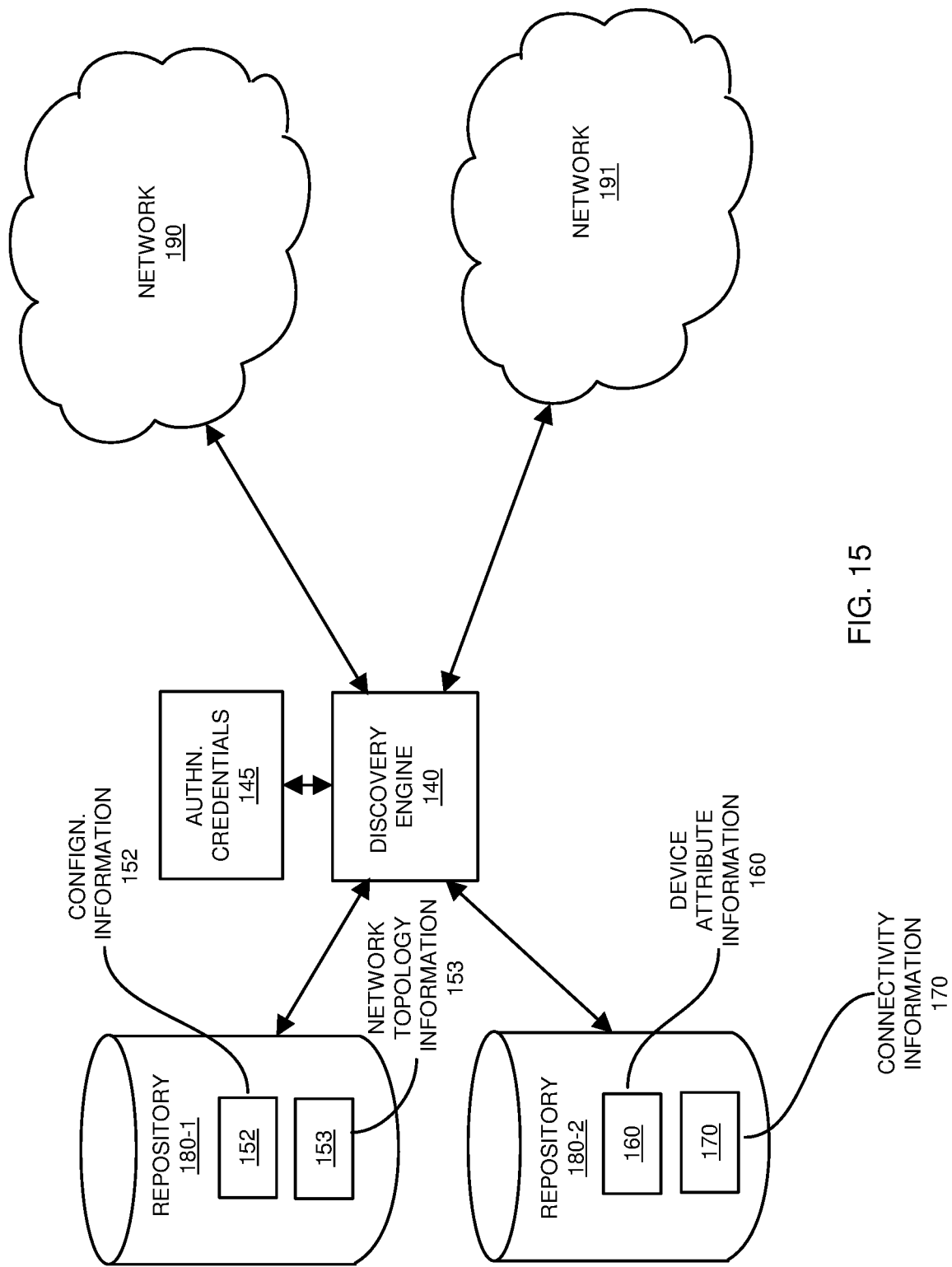
FIG. 15 is an example diagram illustrating discovery in a merged network environment according to embodiments herein.

FIG. 15 is an example diagram illustrating discovery of a newly merged network into an existing network according to embodiments herein.

As shown, and as previously discussed, the discovery engine 140 monitors network 190 and produces respective network topology information 153 based on automated discovery of network devices during a first discovery phase and a second discovery phase.

In this example embodiment, assume that the previously discovered network 190 is newly merged with new network 193 and corresponding network devices. In such an instance, in a similar manner as previously discussed, the discovery engine 140 performs a first discovery phase and a second discovery phase to learn of attributes and interconnectivity of network devices in network 193 as well as connectivity between network devices in network 193 and network devices in network 190.

In one embodiment, based on newly discovered network 193, and respective merging with network 190, the discovery engine 140 updates the network topology information 153 to include attributes of network devices in both network 190 and network 193 as well as interconnectivity of network devices between the networks.

Note again that techniques herein are well suited to discover presence of network devices and produce network topology information indicating connectivity of the network devices as well as their attributes. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method comprising:
   from computer processor hardware:
   generating communications to multiple network addresses to detect presence of multiple network devices in a network;
   subsequent to detecting the presence, communicating with each of the multiple network devices to retrieve connectivity information indicating physical port interconnectivity amongst the multiple network devices; and
   producing network topology information based on the detected presence and the retrieved connectivity information, the network topology information indicating attributes and the physical port interconnectivity of the multiple network devices;
   wherein communicating with each of the multiple network devices includes:
   communicating first credential information over a first communication link to a first network device of the multiple network devices, communication of the first credential information to the first network device providing the computer processor hardware access to first connectivity data associated with the first network device; and
   utilizing the first connectivity data to identify: i) a second network device to which the first network device is coupled via a second communication link, and ii) that the second communication link couples a first port of the first network device to a second port of the second network device.

2. The method as in claim 1, wherein generating communications to multiple network addresses to detect presence of the multiple network devices in the network includes:
   for each respective network address of the multiple network addresses, transmitting communications to multiple different Internet socket port numbers to learn of attributes associated with a corresponding network device assigned the respective network address.

3. The method as in claim 1 further comprising:
   tracking which of the multiple network addresses are assigned to corresponding network devices in the network; and
   wherein communicating with each of the multiple network devices includes: for each tracked network address assigned to a corresponding network device, communicating with the corresponding network device to retrieve respective connectivity data, the respective connectivity data indicating interconnectivity of the corresponding network device amongst the multiple network devices.

4. The method as in claim 3, wherein the respective connectivity data indicates physical port to port connectivity of the corresponding network device to at least one other network device in the network.

5. The method as in claim 1, wherein communicating with each of the multiple network devices includes:
   communicating with the first network device in the network to learn of a network address assigned to the second network device communicatively coupled to the first network device; and
   utilizing the network address of the second network device to communicate with the second network device and learn of a network address assigned to a third network device communicatively coupled to the second network device.

6. The method as in claim 5, wherein producing the network topology information based on the detected presence and the retrieved interconnectivity information includes:
   producing the network topology information to indicate that the second network device is communicatively coupled via a physical communication link to the first network device in response to receiving the first connectivity data from the first network device indicating that the second network device is communicatively coupled to the first network device.

7. A method comprising:
   from computer processor hardware:
   generating communications to multiple network addresses to detect presence of multiple network devices in a network;
   subsequent to detecting the presence, communicating with each of the multiple network devices to retrieve connectivity information indicating physical port interconnectivity amongst the multiple network devices; and
   producing network topology information based on the detected presence and the retrieved connectivity information, the network topology information indicating attributes and the physical port interconnectivity of the multiple network devices;
   wherein generating communications to the multiple network addresses to detect presence of the multiple network devices includes:

i) for a first network address:
transmitting a first message from a discovery engine to the first network address to detect presence of a first network device and establish a first communication link;
communicating with the first network device over the first communication link to learn of attributes of the first network device;
ii) for a second network address:
transmitting a second message from the discovery engine to the second network address to detect presence of a second network device and establish a second communication link; and
communicating with the second network device over the second communication link to learn of attributes of the second network device;
wherein the first network device participates in establishing the first communication link without requiring authentication of the discovery engine; and
wherein the second network device participates in establishing the second communication link without requiring authentication of the discovery engine; and
wherein communicating with each of the multiple network devices to learn of the interconnectivity amongst the multiple network devices includes:
providing credentials to the first network device to establish a first authenticated communication session with the first network device;
communicating over the first authenticated communication session to learn of a first set of network addresses of corresponding one or more network devices coupled to the first network device;
providing credentials to the second network device to establish a second authenticated communication session with the second network device; and
communicating over the second authenticated communication session to learn of a second set of network addresses of corresponding one or more network devices coupled to the second network device.

8. The method as in claim 7, wherein the first network device is operable to produce first connectivity data indicating which of the multiple network devices is directly coupled to a respective port of the first network device;
wherein communicating over the first authenticated communication session includes retrieving the first connectivity data from the first network device;
wherein the second network device is operable to produce second connectivity data indicating which of the multiple network devices is directly coupled to a respective port of the second network device; and
wherein communicating over the second authenticated communication session includes retrieving the second connectivity data from the second network device; and
wherein producing the network topology information based on the detected presence and retrieved interconnectivity information includes: identifying the interconnectivity of the multiple network devices using the first connectivity data and the second connectivity data.

9. A system comprising:
multiple network devices;
a discovery engine executed by computer processor hardware;
the discovery engine operable to:
generate communications to multiple network addresses to detect presence of multiple network devices in a network;
subsequent to detecting the presence, communicate with each of the multiple network devices to learn of port-to-port interconnectivity amongst the multiple network devices; and
produce network topology information based on the detected presence and learned port-to-port interconnectivity, the network topology information indicating attributes and port-to-port interconnectivity of the multiple network devices;
wherein the discovery engine is further operable to:
i) for a first network address:
transmit a first message from a discovery engine to the first network address to detect presence of a first network device and establish a first communication link;
communicate with the first network device over the first communication link to learn of attributes of the first network device;
ii) for a second network address:
transmit a second message from the discovery engine to the second network address to detect presence of a second network device and establish a second communication link; and
communicate with the second network device over the second communication link to learn of attributes of the second network device;
wherein the first network device is operable to participate in establishing the first communication link without requiring authentication of the discovery engine; and
wherein the second network device is operable to participate in establishing the second communication link without requiring authentication of the discovery engine;
wherein the discovery engine is further operable to:
provide credentials to the first network device to establish a first authenticated communication session with the first network device;
communicate over the first authenticated communication session to learn of a first set of network addresses of corresponding one or more network devices coupled to the first network device;
provide credentials to the second network device to establish a second authenticated communication session with the second network device; and
communicate over the second authenticated communication session to learn of a second set of network addresses of corresponding one or more network devices coupled to the second network device.

10. The system as in claim 9, wherein the discovery engine is operable to:
for each respective network address of the multiple network addresses, transmit communications to multiple different Internet port numbers to learn of attributes associated with a corresponding network device assigned the respective network address.

11. The system as in claim 9, wherein the first network device is operable to produce first connectivity data indicating which of the multiple network devices is directly coupled to a respective port of the first network device;

wherein the discovery engine is operable to retrieve the first connectivity data from the first network device over the first authenticated communication session;

wherein the second network device is operable to produce second connectivity data indicating which of the multiple network devices is directly coupled to a respective port of the second network device;

wherein the discovery engine is operable to retrieve the second connectivity data from the second network device over the second authenticated communication session; and wherein the discovery engine is further operable to: identify the interconnectivity of the multiple network devices using the first connectivity data and the second connectivity data.

12. Computer-readable storage hardware having instructions stored thereon, the instructions, when executed by computer processor hardware, cause the computer processor hardware to:

generate communications to multiple network addresses to detect presence of multiple network devices in a network;

subsequent to detecting the presence, communicate with each of the multiple network devices to learn of a port-to-port interconnectivity amongst the multiple network devices; and produce network topology information based on the detected presence and learned port-to-port interconnectivity, the network topology information indicating attributes and port-to-port interconnectivity of the multiple network devices;

wherein the executed instructions further cause the computer processor hardware to:

communicate first credential information over a first communication link to a first network device of the multiple network devices, communication of the first credential information to the first network device providing the computer processor hardware access to first connectivity data associated with the first network device; and utilize the first connectivity data to identify: i) a second network device to which the first network device is coupled via a second communication link, and ii) that the second communication link couples a first port of the first network device to a second port of the second network device.

13. The method as in claim 5 further comprising:
communicating with the second network device via communications through the first network device.

14. The method as in claim 13 further comprising:
communicating with the third network device via communications through the second network device.

15. The method as in claim 1, wherein the retrieved connectivity information includes: second connectivity data retrieved from the second network device.

16. The method as in claim 15, wherein the second connectivity data indicates connectivity between a third port and a fourth port, the third port belonging to the second network device, the second port belonging to a third network device.

17. The method as in claim 1, wherein generating communications to multiple network addresses to detect presence of the multiple network devices in the network includes:

via communications with multiple Internet ports of the first network device of the multiple network devices, retrieving attributes associated with the first network device; and via communications with multiple Internet ports of the second network device of the multiple network devices, retrieving attributes associated with the second network device.

18. The method as in claim 1, wherein communicating with each of the multiple network devices includes:

communicating second credential information through the first network device and the second communication link to the second network device, communication of the second credential information to the second network device providing the computer processor hardware access to second connectivity data associated with the second network device; and utilizing the second connectivity data to identify: i) a third network device to which the second network device is coupled via a third communication link, and ii) that the third communication link couples a third port of the second network device to a fourth port of the second network device.

* * * * *